US010165168B2

(12) United States Patent
Schoenberg et al.

(10) Patent No.: US 10,165,168 B2
(45) Date of Patent: Dec. 25, 2018

(54) MODEL-BASED CLASSIFICATION OF AMBIGUOUS DEPTH IMAGE DATA

(71) Applicant: Microsoft Technology Licensing, LLC, Redmond, WA (US)

(72) Inventors: Michael John Schoenberg, Seattle, WA (US); Michael Bleyer, Seattle, WA (US); Christopher S. Messer, Redmond, WA (US); Denis Demandolx, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 15/224,257

(22) Filed: Jul. 29, 2016

(65) Prior Publication Data

US 2018/0033145 A1 Feb. 1, 2018

(51) Int. Cl.
*G06K 9/00* (2006.01)
*H04N 5/225* (2006.01)
(Continued)

(52) U.S. Cl.
CPC ....... *H04N 5/2256* (2013.01); *G06K 9/00201* (2013.01); *G06T 5/40* (2013.01);
(Continued)

(58) Field of Classification Search
CPC .......... G06T 7/0018; G06T 7/0055; G06T 2207/10028; G06K 5/40; G06K 9/00201; H04N 5/2256
See application file for complete search history.

(56) References Cited

U.S. PATENT DOCUMENTS 6,535,633 B1    3/2003   Schweid et al.
8,031,906 B2   10/2011   Fujimura et al.
(Continued)

FOREIGN PATENT DOCUMENTS

CN    1489753 A     4/2004
CN  103927717 A     7/2014
(Continued)

OTHER PUBLICATIONS

Camplani et al (Depth-color Fusion Strategy for 3-D Scene Modeling with Kinect, IEEE Transactions on Cybernetics, vol. 43, No. 6, Dec. 2013).*
(Continued)

*Primary Examiner* — Amara Abdi
(74) *Attorney, Agent, or Firm* — Jacob P. Rohwer; Newport IP, LLC

(57) ABSTRACT

Ambiguous portions of an image which have fewer photons of a reflected light signal detected than required to determine depth can be classified as being dark (i.e., reflecting too few photons to derive depth) and/or far (i.e., beyond a range of a camera) based at least in part on expected depth and reflectivity values. Expected depth and reflectivity values for the ambiguous portions of the image may be determined by analyzing a model of an environment created by previously obtained images and depth and reflectivity values. The expected depth and reflectivity values may be compared to calibrated values for a depth sensing system to classify the ambiguous portions of the image as either dark or far based on the actual photon count detected for the image.

19 Claims, 7 Drawing Sheets

(51) Int. Cl.
*G06T 5/40* (2006.01)
*G06T 7/00* (2017.01)

(52) U.S. Cl.
CPC .......... *G06T 7/0018* (2013.01); *G06T 7/0055* (2013.01); *G06T 2207/10028* (2013.01)

(56) References Cited

U.S. PATENT DOCUMENTS

| | | | |
|---|---|---|---|
| 8,675,971 | B2 | 3/2014 | Rao |
| 8,842,118 | B1 | 9/2014 | White et al. |
| 2005/0265600 | A1 | 12/2005 | Li et al. |
| 2007/0065002 | A1* | 3/2007 | Marzell .............. G06T 17/00 382/154 |
| 2009/0214114 | A1 | 8/2009 | Bengtsson et al. |
| 2013/0063566 | A1 | 3/2013 | Morgan-Mar et al. |
| 2015/0004558 | A1* | 1/2015 | Inglese .............. A61B 6/14 433/29 |
| 2015/0092017 | A1 | 4/2015 | Kang et al. |
| 2016/0292872 | A1* | 10/2016 | Hammond .......... G01S 17/66 |

FOREIGN PATENT DOCUMENTS

| | | |
|---|---|---|
| EP | 2538242 A1 | 12/2012 |
| EP | 2775723 A1 | 10/2014 |

OTHER PUBLICATIONS

Mallick et al: (Characterizations of Noise in Kinect Depth Images: A Review, IEEE sensors Journal, vol. 14, No. 6, Jun. 2014).*

Complani et al (Accurate depth-color scene modeling for 3-D contents generation with low cost depth cameras, IEEE 2012, pp. 1741-1744).*

Camplani et al (Depth-color Fusion Strategy for 3-D Scene Modeling with Kinect, IEEE Transactions on Cybernetics, vol. 43, No. 6, Dec. 2013) (Year: 2013).*

Camplani, et al., "Depth-Color Fusion Strategy for 3-D Scene Modeling With Kinect", In Proceedings of the IEEE Transactions on Cybernetics, vol. 43, Issue 6, Dec. 6, 2013, pp. 1560-1571.

"International Search Report and Written Opinion Issued in PCT Application No. PCT/US2017/042959", dated Oct. 19, 2017, 9 Pages.

Oruc, "Comparison of Pixel-Based and Object-Oriented Classification Approaches Using Landsat-7 ETM Spectral Bands," published Jul. 19, 2004, Proceedings of ISPRS Annual Congress, 5 pages.

Lowe et al., "Multispectral Image Analysis Using Random Forest," In International Journal on Soft Computing, vol. 6, Issue 1, Feb. 2015, pp. 1-14.

Mobley, "Continued Development of the Look-up-table (LUT) Methodology for Interpretation of Remotely Sensed Ocean Color Data," published Jan. 2009, available at <<http://www.onr.navy.mil/en/Science-Technology/Departments/Code-32/All-Programs/Atmosphere-Research-322/Environmental-Optics/~/media/.D0AC726E90034A83B3618461E044F3E9.ashx>> 11 pages.

Shin, "Photon-Efficient Computational 3-D and Reflectivity Imaging with Single-Photon Detectors," published Jun. 2015, Proceedings of IEEE Transactions on Computational Imaging, vol. 1, Issue 2, 14 pages.

U.S. Appl. No. 14/695,623, filed Apr. 24, 2015, Michael John Schoenberg, "Model-Based Classification of Ambiguous Depth Image Data," 22 pages.

* cited by examiner

FIG. 4

MODEL-BASED CLASSIFICATION OF AMBIGUOUS DEPTH IMAGE DATA

BACKGROUND

Imaging devices, such as depth sensing systems, can be used to capture images of real-world environments and determine depth for the images using various techniques. For example, some depth sensing systems (i.e., Time-of-Flight (ToF) camera systems) project light onto a real world environment and resolve depth based on the known speed of light and the round trip time-of-flight of light signals in the projected light pattern for each point in an image. However, computing devices including these depth sensing systems suffer ambiguities for depth points in captured images when the number of captured photons in a measured light signal is insufficient to determine depth. For example, an image may include portions which represent objects in the environment whose material properties (e.g., reflectivity) are such that very few photons are reflected (i.e., "dark" portions), or they may represent areas of the environment in which no objects reside to reflect light within a maximum sensing range of the depth sensing system (i.e., "far" portions). When constructing depth maps, these depth sensing systems are unable to provide valid depth data for these dark portions and far portions and may simply mark such portions as invalid in the resulting depth map. However, in some applications of these depth maps, such as surface reconstruction of an environment, this solution may result in visual obscurities or inaccuracies as the default logic for representing dark portions in an image is different than the default logic for representing far portions in an image.

SUMMARY

This disclosure describes techniques for resolving depth ambiguities in image data for portions of an image by classifying an ambiguous portion of an image as being either "far" or "dark."

In some examples, depth sensing systems, such as ToF systems, may include one or more image capturing devices to capture an image of an environment, and one or more light projecting sensors to project light (i.e., infrared light, near-infrared light, etc.) onto an environment and capture the reflected light signals which bounce off objects in the environment. These depth sensing systems may further include logic, or be associated with a computing device including logic, to determine depth of objects in the environment which are captured in an image by an image capturing device. For example, a computing device associated with depth sensing systems may use various techniques of analyzing the light to determine depth. In various examples, a computing device may identify ambiguous portions of an image captured by the image capturing device of the depth sensing system, such as dark portions and/or far portions, for which an insufficient number of photons in a reflected light signal are detected or captured than is required to determine depth in the environment. In some examples, the number of captured photons may be equivalent with raw image intensity or image pixel density, such as infrared (IR) intensity for an IR camera.

In various examples of the techniques described herein, a computing device, such as a depth sensing system, may include one or more modules configured to analyze a model of a real-world environment which represents depth and reflectivity values of portions of images of the environment that have previously been obtained by the depth sensing system. By analyzing this model of the environment, the computing device may identify portions of the model which overlap with or otherwise correspond to the ambiguous portions of the captured image. Based on these overlapping or corresponding portions of the model, the depth sensing system may determine expected depth and reflectivity values for the ambiguous portions of the captured image.

In some examples, the expected depth and reflectivity values for the ambiguous portions of the captured image may be compared to known calibrated values for a number of photons that are expected, for a particular depth sensing system, based on the expected depth and reflectivity values for the ambiguous portions of the image. In various examples, the calibrated values may be based on a calibration curve that represents previously obtained photon counts for known depth and reflectivity values for the particular depth sensing system. Based at least in part on the expected photon count, the depth sensing system may classify the ambiguous portions of the image as either dark portions or far portions.

The techniques described herein provide improved capabilities for depth sensing system computing devices to classify ambiguous depth image data. In some examples, portions of an image captured by a depth sensing system may be ambiguous in that it cannot be determined whether the ambiguous portions are dark or far portions. If an ambiguous portion of an image is classified incorrectly as dark or far, some application of depth data, such as surface reconstruction, may result in visual inaccuracies or absurdities, such as incorrectly classifying a dark portion as a far portion and removing it from the image rather than representing it as a dark object. By implementing the techniques described herein, depth sensing systems may more effectively determine whether ambiguous portions of an image are dark or far portions, which in turn improves the functioning of the depth sensing systems in various applications of depth data. Thus, the techniques described herein improve the functioning of depth sensing systems by improving their ability to analyze depth data, classify ambiguous depth data, and apply the depth data in various applications.

According to one configuration disclosed herein, the techniques may be applied using a wearable depth sensing computing system, such as a computing system implemented in glasses or a head-mounted computing device which includes a depth sensing system. However, the techniques may be applied in any type of computing environment which includes depth sensing systems. For example, the techniques may be applied using a laptop and/or desktop computing devices having a depth sensing system, a game console with a depth sensing system, a vehicle display with a depth sensing system, etc.

It should be appreciated that the subject matter described briefly above and in greater detail below can be implemented as a computer-controlled apparatus, a computer process, a computing device, or as an article of manufacture, such as a computer readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, which the left-most upper digit of a reference number identifies the figure in which the reference number first appears. The use of the same reference numbers in the same or different figures indicates similar or identical items or features.

FIG. 4 is a schematic diagram showing an example illustration for determining expected depth and reflectivity values for ambiguous portions of a captured image based on values from an environment model.

DETAILED DESCRIPTION

Figure 1:
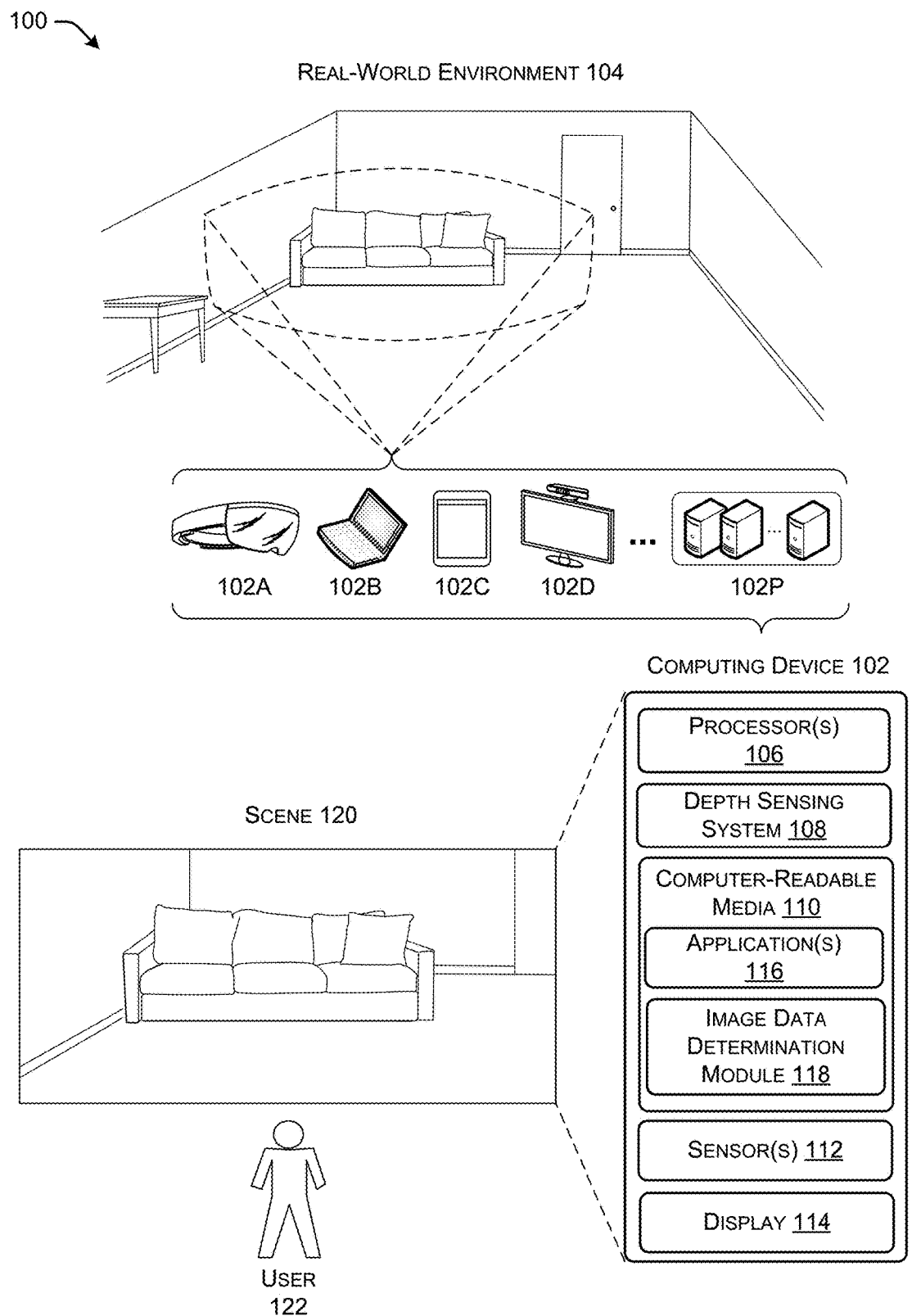
FIG. 1 is a schematic diagram showing an example environment for classifying ambiguous portions of a captured image as dark or far.

As discussed briefly above, depth sensing systems can be used to capture images of a real-world environment and determine depth using various techniques. For example, the depth sensing systems described herein may include a projector to project light onto an environment and capture the reflected signal to determine depth for objects in the environment. However, as noted above, existing techniques for determining depth for an environment captured in an image suffer deficiencies when classifying ambiguous image data for portions of the image as being either "far" portions of the image or "dark" portions of the image. In some applications of depth sensing technologies, this classification problem for the ambiguous portions of the image results in visual obscurities or inaccuracies that degrade user viewing and/or interaction experiences due to differences in logic for representing dark portions and far portions of an image. For example, a dark portion may exist in an image that, if incorrectly classified as a far portion, may trigger logic which results in the area behind the dark object looking "blown out," or as an empty black space, rather than as a dark object in an environment. Similarly, a far portion of an image, if incorrectly classified as a dark object, may trigger logic which results in "ghosts" where the environment representation includes objects that were not properly removed even though the objects are no longer present.

This disclosure describes techniques for resolving depth ambiguities in image data associated with portions of an image by classifying an ambiguous portion of the image as being either far or dark. In some examples, depth for portions of an image may be determined by analyzing photons in a reflected light signal, such as a magnitude of photons reflected back to a depth sensing system, or a number of photons reflected back to a depth sensing system. However, to calculate depth for portions of an image, a threshold number of detected photons (i.e., photon depth threshold) may be required to accurately determine depth for objects in an environment captured in the image. In some examples, a "dark" portion of an image may comprise a portion of the image depicting an object that exists in an environment and that is within a maximum sensing range of a depth sensing system, but which has material properties, such as reflectivity, that reflect fewer photons in a light signal than is required by a particular depth sensing system to determine depth. In various examples, a "far" portion of an image may comprise a portion of the image depicting an area of an environment in which no objects reside to reflect light projected by the particular depth sensing system. In some examples, depth sensing systems may have difficulties classifying ambiguous portions of an image as being either dark or far because in both classifications, fewer photons in a reflected light signal are detected than are required to determine depth. That is, it may be unclear whether a reason for a low number of photons is because an object is dark, is far, or is both dark and far.

The techniques described herein resolve ambiguities in image data for ambiguous portions of an image by classifying the ambiguous portions of the image as either dark or far based on a model or representation of the environment which includes depth and reflectivity values for positions in space in the environment. In some examples, one or more modules of a computing device associated with, including, or included in a depth sensing system may determine or calculate depth and reflectivity values for points in space in an environment, such as points in space which define objects in the environment, for images obtained by the depth sensing system. For example, as a depth sensing system (e.g., camera, light projector, light sensor, etc.) associated with a computing device captures images of an environment, projects light onto the environment, and collects reflected light signals from the environment, modules of the associated computing device may calculate and store depth and reflectivity values for points in space of the environment. In some examples, the modules may store the depth and reflectivity values as a model or representation of the environment. For instance, the model of the environment may comprise a three-dimensional (3D) volumetric pattern or mesh that defines surfaces of the environment. In some instances, the model may have depth and reflectivity values associated with various points defined by the surfaces in the environment, such as surfaces of objects in the environment. While the environmental model is described herein as a 3D, volumetric model which has depth and reflectivity values associated with points in space, such as points along surfaces of objects in the environment, the environmental model may comprise any type of data structure configurable to store and provide access to depth and reflectivity values for locations in an environment, such as a table populated with 3D locations and associated depth and reflectivity values.

In some examples, the depth sensing system may capture a particular image of the environment as well as image data, such as data associated with a reflected light signal of light projected by the depth sensing system. The modules of the computing device associated with the depth sensing system may determine depth and reflectivity values for various portions of the image based the image data obtained by the depth sensing system. However, the modules may be unable to determine depth and reflectivity values for ambiguous portions of the image because the image data for those ambiguous portions of the image include a number of photons detected or captured that is less than the required photon depth threshold number for determining depth for portions of an image. The modules may analyze the model of the environment which represents the depth and reflectivity values of points in space of the environment that were determined from previously obtained images and image data. In some examples, analyzing the model of the environment may include creating a volumetric frame representing the environment and which includes the respective depth and reflectivity values for the environment such that the frame represents the current state of the model (i.e., the model as it currently exists in real-time or near real-time). The analyzing may further include creating a volumetric frame of the image of the environment which includes the ambiguous portions. Even further, the analyzing of the model may include rasterizing, ray casting, rendering, or otherwise projecting the frame representing the current state of the model on top of the frame of the image including the ambiguous portions. In this way, points in space of the frame of the current state of the model may overlap, or otherwise be associated with, points in space of the ambiguous portions of the frame of the image. Thus, the known depth and reflectivity values of the model that correspond with or overlap onto the ambiguous portions of the image may be identified and used to calculate expected depth and reflectivity values for the ambiguous portions.

In various examples, the expected depth and reflectivity values for the ambiguous portions of the image may be determined based on previous and current locations of the depth sensing system in the environment. For example, the computing device associated with the depth sensing system may additionally determine and store locations of the depth sensing system in the environment where the previously obtained images were captured, such as by using various sensors (e.g., proximity sensors, Global Positioning System (GPS) sensors, Cellular Network sensors, accelerometers, etc.). In some examples, the depth sensing system may be placed in a static location in the environment, which allows for the same depth and reflectivity values of the previously obtained images stored in the environmental model to be used without modification or calibration. In other examples, the depth sensing system may be non-static or moveable, resulting in the depth and reflectivity values having to be calibrated based on the various positions of where images were captured. For example, the depth and reflectivity values of the previously obtained images may be associated with a first location, and the ambiguous portions of the image may be associated with a second, different location. To calculate or determine the expected depth and reflectivity values for the ambiguous portions of the image, the known depth and reflectivity values of the model that correspond to the ambiguous portions of the image may have to be calibrated and/or recalculated based on the difference in position, orientation, and/or illumination between the first and second positions to determine the expected depth and reflectivity values for the ambiguous portions of the image.

In some examples, an actual measured number of photons for the ambiguous portions of the image may be higher than a noise threshold for the particular depth sensing system. The noise threshold for the particular depth sensing system may be a minimum number of reflected photons that must be detected by the depth sensing system to allow the depth sensing system to determine that light is being reflected, rather than simply detecting ambient light in the environment. This noise threshold may correspond to the maximum sensing range/depth of the particular sensing system as the magnitude of a light signal will degrade over distance in an environment. Thus, if an actual measured number of photons for an ambiguous portion of an image is higher than the noise threshold for the particular depth sensing system, it may be determined that an object must lie within the maximum sensing range of the particular depth sensing system. However, because the portion of the image is still ambiguous, in that the actual measured number of photons is less than a photon depth threshold, depth for this particular ambiguous portion of the image still cannot be determined. In instances such as these, the ambiguous portion of the image which has an actual measured number of photons that is more than the noise threshold of the particular depth sensing system, but less than the photon depth threshold required to determined depth for a portion of an image, this particular ambiguous portion of the image may be classified as dark when determining depth. In other words, an object does lie within the maximum sensing range of the particular depth sensing system, but the object is dark in that its depth and reflectivity are such that the number of photons sensed by the depth sensing system cannot be used to accurately determine depth, making the object a dark object.

In some examples, the actual number of photons detected for the ambiguous portions of the image may be lower than the noise threshold for the particular depth sensing system. In such examples, it may be difficult to determine whether a dark object is reflecting no light or very little light, or if there are no objects within the maximum sensing range of the particular depth sensing system to reflect light to overcome the noise threshold. In examples where the actual number of photons detected for the ambiguous portions of the image is lower than the noise threshold for the particular depth sensing system, the modules of the computing device associated with the particular depth sensing system may compare the expected depth and reflectivity values determined for the ambiguous portions of the image with calibrated values for the particular depth sensing system to determine an expected number of photons that should be detected by the particular depth sensing system. For example, the expected depth and reflectivity values for the ambiguous portions of the image may be compared to predetermined, calibrated values for the particular depth sensing system that indicate a number of photons that may be expected to be detected by the particular depth sensing system based on the expected depth and reflectivity values for the ambiguous portions of the image.

In some examples, the calibrated values may comprise a calibration curve that has been created based on training data obtained from other images captured by the depth sensing system. For example, by obtaining a plurality of training images and associated image data, ranges of different depth and reflectivity values may be calculated and associated with their respective number of photons detected. This training data may then be plotted in a chart, such as a histogram, which represents the photon count that is expected to be detected by the particular depth sensing device for the expected depth and reflectivity values. In other examples, the calibrated values may be determined analytically, or by observing internal properties of the particular depth sensing system, to create calibrated values indicating a number of photons that are expected to be detected for particular depth and reflectivity values.

In various examples, based upon the comparison of the expected depth and reflectivity values for the ambiguous portions of the image with the calibrated values (e.g., calibration curve), an expected number of photons may be determined for the ambiguous portions of the image. Stated otherwise, based on the expected depth from the depth sensing system and on the expected reflectivity of the environment captured in the ambiguous portions of the image, a number of photons expected to be detected by the particular depth sensing system may be determined. Using the expected number of photons for the expected depth and reflectivity values, a comparison may be made to the actual measured number of photons for the ambiguous portions of the image.

In some examples, the expected number of photons may indicate that an object does exist and it should be detectable based on the expected depth and reflectivity of the object. Stated otherwise, at the expected depth and based on the expected reflectivity for a particular ambiguous portion, the calibration curve indicates that an object should be detectable. However, because the actual number of photons is lower than the noise threshold, it may be determined that the particular ambiguous portion of has a far classification because the depth sensing system is unable to detect the object due to the object being outside the maximum sensing range to overcome the noise threshold for the particular depth sensing system.

In various examples, the expected number of photons may indicate that, for a particular ambiguous portion of the image, no object is detectable. Stated otherwise, at the expected depth and based on the expected reflectivity, an object should not be detectable based on its expected number of photons because not enough photons will be reflected to the depth sensing system. In such examples, the particular ambiguous portion of the image may be classified as dark because, based on the expected depth and reflectivity and the expected photon count, the ambiguous portion of the image should not be detectable in that not enough photons are expected to be reflected to be detectable by the depth sensing system.

Thus, the techniques described herein resolve depth ambiguities in image data associated with portions of an image by classifying an ambiguous portion of the image as being either far or dark based on models of an environment created using previously obtained images.

While certain specific examples are described involving various hardware and software configurations, the techniques described herein are not limited to those examples and may be implemented using any computing device or combination of computing devices capable of obtaining images of an environment and depth data for those images. Examples of other computing devices that are usable to implement the techniques described herein include, without limitation desktop computers, laptop computers, tablet computers, mobile devices, smartphones, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device including or having access to a camera and depth sensing sensors, such as light projectors.

Although the subject matter described herein is primarily presented in the general context of determining depth using time-of-flight systems, the techniques described herein may apply to any type of depth detection system which uses light signals to determine depth. For instance, techniques which determine depth based on density of photons in reflected light signals, movements of light in a reference light pattern caused by projecting the light pattern onto an object, or any other method for determining depth using a light signal may implement the techniques described herein.

As noted above, the techniques described herein may provide improved capabilities for depth sensing system computing devices to classify ambiguous depth image data. In some examples, portions of an image captured by a depth sensing system may be ambiguous in that it cannot be determined whether the ambiguous portions are dark or far portions. By implementing the techniques described herein, depth sensing systems may more effectively determine whether ambiguous portions of an image are dark or far portions, which in turn improves the functioning of the depth sensing systems in various applications of depth data. Thus, the techniques described herein improve the functioning of depth sensing systems by improving their ability to analyze depth data, classify ambiguous depth data, and apply the depth data in various applications.

These and various other example features will be apparent from a reading of the following description and a review of the associated drawings. However, the claimed subject matter is not limited to implementations that solve any or all disadvantages or provide any of the benefits noted in any part of this disclosure.

Example Environments

FIG. 1 is a schematic diagram showing an example environment 100 for classifying ambiguous portions of a captured image as dark or far. The example environment may include one or more computing devices 102 configured to capture images and classify ambiguous portions of the images as being either far portions or dark portions. Example computing device(s) 102 illustrated in this figure include a head-mounted computing device 102A, a laptop computing device 102B, a tablet computer 102C, a gaming device 102D, and a distributed computing environment 102P. However, as discussed above, the techniques described herein can also be implemented using any other computing device including or having access to a camera and other sensors capable of capturing images and determining depth for objects captured in the images.

In this example, the computing device(s) 102 may include sensors to capture an image of real-world environment 104. Moreover, the computing device(s) 102 may include sensors to project a light signal onto the real-world environment 104. The light signal that is projected onto the real-world environment 104 may be reflected off objects in the real-world environment 104 and back to the computing device(s) 102. The sensors of the computing device(s) 102 may capture or sense the reflected light and the computing device(s) 102 may determine depth for the objects in the real-world environment 104 based on the reflected light.

In some examples, the computing device(s) 102 may include one or more processing unit(s) (e.g., processor(s) 106), a depth sensing system 108, computer-readable media 110, such as memory, one or more sensors 112 (e.g., proximity sensors, GPS sensors, a gaze tracking camera, an environmental camera, accelerometers, etc.), and a display 114. The depth sensing system 108 may include various devices, such as a camera to capture images of real-world environment 104, a light projector to project a light signal onto the real-world environment 104, and a light sensor to capture light reflected off the real-world environment 104. The computer-readable media 110 may include an image data determination module 118 which analyzes the image and reflected light captured by the depth sensing system 118. The image data determination module 118 may be configured to determine depth for the image captured by the depth sensing system 108 based on the reflected light obtained from the depth sensing system 108. Computer-readable media 110 may further include one or more applications 116, such as an operating system, a browser, or the like. In some examples, the sensor(s) 112 may determine a location of the computing device(s) 102 in the real-world environment 104 as the depth sensing system 108 captures images and light reflected off the real-world environment 104.

In some examples, the image data determination module 118 may further be configured to create and analyze a model or representation of the real-world environment 104 based on previous images obtained by the depth sensing system 108 and locations determined by the sensor(s) 112 of where those previous images were obtained. By analyzing a model of the environment, the image data determination module 118 may identify expected depth and reflectivity values for ambiguous portions of the image captured by the depth sensing system 108. The image data determination module 118 may further compare the expected depth and reflectivity values with calibrated values to identify an expected photon count, and classify the ambiguous portions of the image as being either dark or far based on the expected photon count.

In various examples, the display 114 may be configured to present a scene 120 to a user 122. For example, the image data determination module 118 may compute a depth map based on depth values determined for the image and the classification of the ambiguous portions of the image, and cause a surface reconstruction of the environment 104 to be presented on the display 114. In this way, the scene 120 may represent a surface reconstruction of the real-world environment 104 which contains appropriately classified and represented dark and far portions of the image. In some examples, the display 114 may further insert virtual or digital objects into the scene 120 based on the depth determined for the real-world environment. For instance, the scene 120 may represent the environment 104 on the display 114 and further include virtual objects which have been placed appropriately in various locations on the display 114 based on the depth data determined for the real-world environment.

Example Computing Devices

Figure 2:
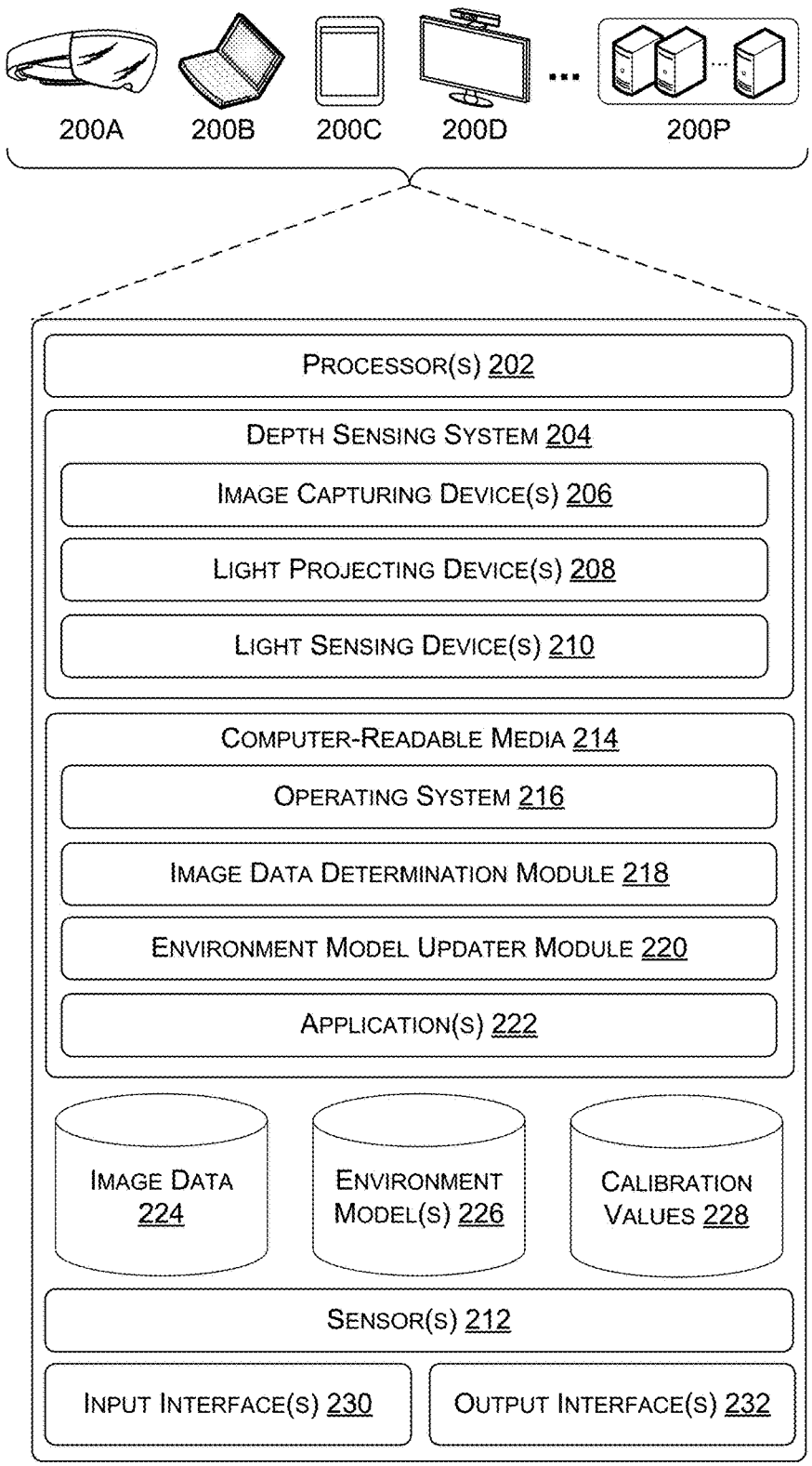
FIG. 2 illustrates details of an example computing device for classifying ambiguous portions of a captured image as dark or far.

FIG. 2 illustrates details of an example computing device 200 that may be used for classifying ambiguous portions of a captured image as dark or far. As illustrated, the computing device 200 (e.g., head-mounted computing device 200A, a laptop computing device 200B, a tablet computer 200C, a gaming device 200D, and a distributed computing environment 200P) may be representative of any of the computing devices 102 in FIG. 1. However, computing device 200 can be any type of device configured to determine depth for an image and classify ambiguous portions of the image as being dark or far based on the techniques described herein. This example is provided for illustrative purposes and is not to be construed as limiting.

Computing device 200 may include one or more processors 202 which can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOCs), Complex Programmable Logic Devices (CPLDs), etc. In some examples, the processor(s) 202 may additionally or alternatively comprise a holographic processing unit (HPU) which is designed specifically to process and integrate data from multiple sensors of a computing device and to handle tasks such as spatial mapping, gesture recognition, and voice and speech recognition. In any case, the CPU, GPU, and/or HPU can be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may be executed by an HPU. In various examples, the processor(s) 202 can execute one or more instructions, modules, and/or processes to cause the device 200 to perform a variety of functions, such as those described as being performed by computing devices herein. Additionally, each of the processor(s) 202 can possess its own local memory, which also can store program modules, program data, and/or one or more operating systems.

In at least one configuration, the computing device 200 may include a depth sensing system 204, which may include an image capturing device(s) 206, light projecting device(s) 208, and light sensing device(s) 210. While illustrated as being included within the computing device 200, in various examples, the depth sensing system 204 may alternatively be located exterior to the computing device 200 as a separate device. The depth sensing system 204 may be communicatively coupled to the processor(s) 202, or have internal processors, which perform various functions for collecting data. For example, the image capturing device(s) 206 may capture images (e.g., pictures, videos, etc.) of a real-world environment in which it is placed. The light projecting device(s) 208 may project or emit a light signal (e.g., infrared light, near-infrared light, etc.) onto the environment, and the light sensing device(s) 210 may detect the reflected light from the light signal that bounces off or reflects off objects in the real-world environment. For example, the light sensing device(s) 210 may sense, capture, or otherwise detect a number of photons in the reflected light signal.

In at least one example, the computing device 200 may include one or more sensors 212 which may be and device or combination of devices configured to sense conditions of a user or the environment of the user. The sensor(s) 212 may include cameras or other sensors for tracking locations of the gaze of the user in the environment. Additionally, the sensor(s) 212 may include one or more outwardly facing or environmental cameras for capturing images of real-world objects and surroundings of the user. Further, the sensor(s) 212 may include sensors for determining a location of the computing device 200 in an environment, such as accelerometers, proximity sensors, magnetic field sensors, wireless signal sensors (e.g., GPS, cellular, WiFi, etc.) or any other sensor usable to determine a location of the computing device 200.

In some examples, computing device 200 may include computer-readable media 214, which can store components that facilitate interaction between the computing device 200 and a user of the computing device 200, or an environment of the computing device 200. For example, the computer-readable media 214 can include an operating system 216, an image data determination module 218, an environment model updater module 220, and one or more applications 222. The operating system 216 can be configured to manage hardware and services within and coupled to the device 200 for the benefit of other components and/or modules.

In various examples, the image data determination module 218 may comprise computer-readable instruction that, when executed by the one or more processors, perform operations for determining depth for a captured image. The image data determination module 218 may obtain data from image data 224 that has been stored there by the depth sensing system 206, such as captured images and a number of photons detected by the light sensing device(s) 210. The image data determination module 218 may associate portion of images stored in the image data 224 with corresponding number of photons in the image data 224 that were detected by the light sensing device(s) 210. For example, portions (e.g., a pixel, groups of pixels, etc.) of the images may be associated with the number of photons detected by the light sensing device(s) 210 indicated in the image data 224. Based on the number of photons detected, the image data determination module 218 may determine depth and reflectivity values for the portions of the captured images.

In various examples, the image data determination module 218 may identify one or more ambiguous portions of an image. For example, the image data determination module 218 may be unable to determine depth for the ambiguous portions of the image because the number of photons detected is less than the required photon depth threshold number for determining depth for the ambiguous portions of the image. In such instance, the image data determination module 218 may analyze one or more environment models 226. The environment model(s) 226 may comprise data structures which represent the depth and reflectivity values of points in space of the environment that were determined using previously obtained images and image data 224. In some examples, the environment model(s) 226 may be a three-dimensional (3D), volumetric pattern or mesh that defines surfaces of the environment. In some instances, the model may have depth and reflectivity values associated with various points defined by the surfaces in the environment, such as surfaces of objects in the environment. In various examples, the environment model(s) 226 may represent the environment as a polygonal mesh defined by the depth information and textured with the reflectivity information. For instance, the environmental model(s) 226 may comprise a shape of a 3D polyhedral object comprised of vertices, edges, and faces textured by or otherwise associated with reflectivity and/or depth values determined for the surfaces of the environment that are defined by the environmental model(s) 226.

While the environment model(s) 226 is described herein as a 3D, volumetric model which has depth and reflectivity values associated with points in space, such as points along surfaces of objects in the environment, the environment model(s) 226 may comprise any type of data structure configurable to store and provide access to depth and reflectivity values for locations in an environment, such as a table populated with 3D locations and associated depth and reflectivity values. Using the environment model(s) 226, the image data determination module 218 may determine expected depth and reflectivity values for the ambiguous portions of the image. Techniques for determining the expected depth and reflectivity values for the ambiguous portions of the image are described in more detail with respect to FIG. 3 and FIG. 4.

In some examples, the image data determination module 218 may compare the expected depth and reflectivity values for the ambiguous portions of the image with stored calibrated values 228. The calibrated values 228 may indicate a number of photons that are expected to be detected based on the expected depth and reflectivity values. Additionally or alternatively, the calibrated values 228 may comprise a relationship or function that defines minimum reflectivity observable at a given depth. Based on the comparison between the expected depth and reflectivity values with the calibrated values 228, the image data determination module 218 may determine whether to classify the ambiguous portions of the image as far or as dark. Techniques for determining the expected photon count using the calibrated values 228 are described in more detail with respect to FIG. 5.

In various examples, the environment model updater module 220 may comprise computer-readable instructions that, when executed by the one or more processors, perform operations for updating the environment model(s) 226 based on recently received image data. For instance, after the image data determination module 218 has classified any ambiguous portions of a recently received image and associated image data, the environment model updater module 220 may update the environment model(s) 226 to include the new image and its associated depth and reflectivity values. In this way, the environment model(s) 226 may represent the current state of the environment and take into account any changes in the environment, such as movement of objects.

The computing device 200 can include input interface(s) 230 and output interface(s) 232. By way of example and not limitation, the input interface(s) 230 can include a keyboard, keypad, mouse, microphone, touch sensor, touch screen, joystick, control buttons, scrolling buttons, cameras, neural interface, or any other device suitable to generate a signal and/or data defining a user interaction with the device 200. By way of example and not limitation, the output interface(s) 232 can include a display (e.g., holographic display, head-up display, protector, touch screen, liquid crystal display (LCD), etc.), speakers, haptic interfaces, or the like. In some examples, the display may present virtual objects in a scene, such as scene 120. The display may present the virtual objects in the scene where the scene includes a physical, real-world environment that includes the virtual objects when observing the display or looking through the display.

Example Ambiguous Depth Image Data Classification Techniques

Figure 3:
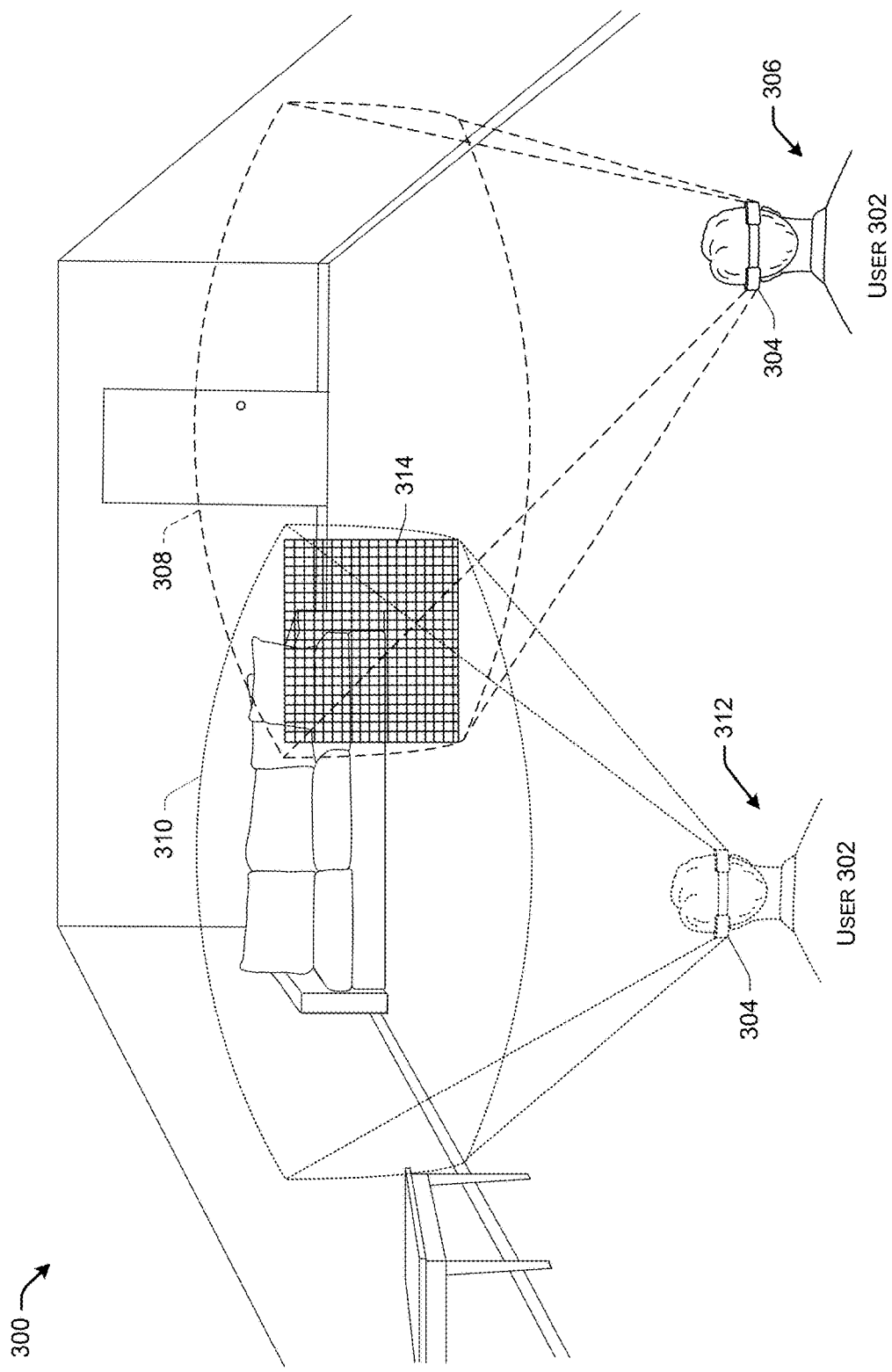
FIG. 3 is a schematic diagram showing an example illustration for capturing an image of an environment and identifying portions of an environment model that overlap with portions of the captured image.

FIG. 3 is a schematic diagram showing an example illustration for capturing an image of an environment 300 and identifying portions of an environment model that overlap with portions of the captured image.

As shown in FIG. 3, a user 302 may be wearing or otherwise associated with a computing device 304, such as computing devices 102 or 200. In some examples, the computing device 304 may include a depth sensing system (e.g., depth sensing system 204) which may have previously obtained images of the environment 300 and associated image data, such as a number of photons associated with various portions of the images. Using the images and the number of photons associated with the image, modules of the computing device 304 (e.g., image data determination module 218 and environment model updater module 220) may have previously determined depth and reflectivity values for the portions of the images and created an environment model which represents the depth and reflectivity values for the portions of the environment 300 that have been captured in the images.

In some examples, the computing device 304 may be at a current position 306 and the computing device 304 may obtain an image 308 of the environment and a number of photons from the current position 306. However, the modules of the computing device 304 may be unable to determine depth and reflectivity values for ambiguous portions of the image 308 due to an insufficient number of photons captured for those ambiguous portions. In such instances, the modules of the computing device 304 may analyze the environment model which represents the previously determined depth and reflectivity values for portions of the environment that have been previously captured in images. The modules of the computing device 304 may analyze a current model frame 310 or state of the environment model and identify points in space that have been previously captured. For example, the computing device 304 may create a model frame 310 which represents the current state of the model, which may have been taken from a second location 312, and rasterize, render, or otherwise project the model frame 310 of the model on top of the image 308 and determine a portion 314 where the model frame 310 overlaps with the image 308. In this way, the ambiguous portions of the image 308 may have the previously determined depth and reflectivity values of the model frame 310 overlapping with or otherwise being associated with the ambiguous portions of the image 308 that are contained in the portion 314. The models of the computing device 304 may determine expected depth and reflectivity values for the portion 314 based on the depth and reflectivity values of the current frame 310, the first location 306, and the second location 312. Techniques for determining the expected depth and reflectivity values will be discussed with more detail with reference to FIG. 4.

Figure 4:
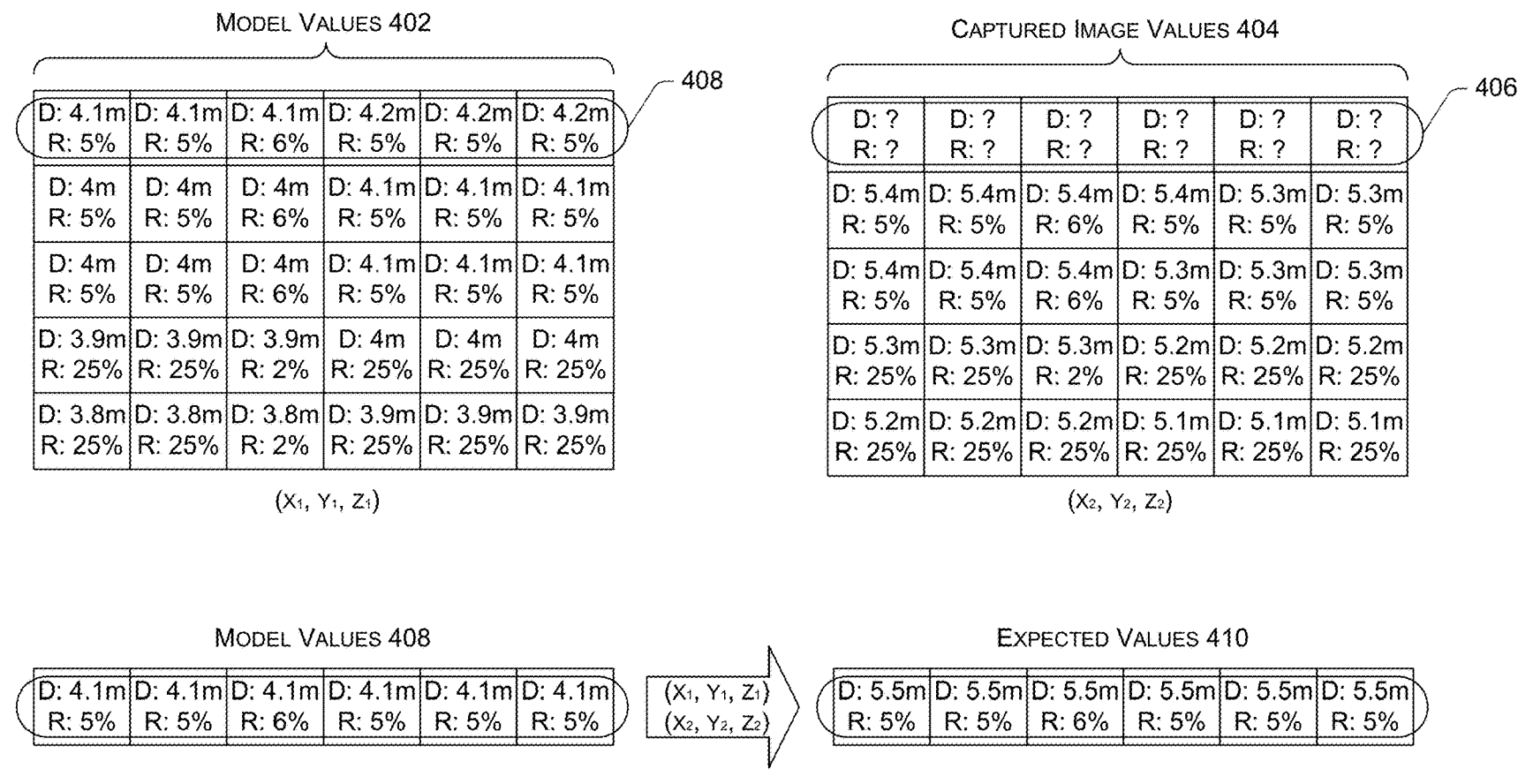

FIG. 4 is a schematic diagram showing an example illustration for determining expected depth and reflectivity values for ambiguous portions of a captured image based on values from an environment model.

As previously described, a computing device (e.g., computing device 200) may include one or more modules (e.g., image data determination module 218 and environment model updater module 220) which may be configured to generate an environment model based on previously obtained images of an environment which includes previously determined depth and reflectivity values for points in space for the environment. As shown in FIG. 4, model values 402 may comprise previously determined depth and reflectivity values for a portion of a frame of such an environment model created by previously obtained images (e.g., pixels, groups of pixels, etc.). The model values 402 may comprise depth and reflectivity values that were calculated or obtained at a first location (e.g., $x_1$, $y_1$, $z_1$) in the environment. In some examples, the particular locations at which the previously obtained images were captured by a depth sensing system may be stored with or otherwise associated with the environment model.

In some examples, a recently captured image may have a portion of the image that is associated with captured image values 404. As shown in FIG. 4, the captured image values 404 may include various portions of the image where the depth and reflectivity values were able to be determined. For example, the number of photons collected for those portions may have been sufficient to determine depth and reflectivity values. However, ambiguous portions 406 of the captured image values 404 may exist where the number of photons collected were insufficient to determine depth and reflectivity values. In some examples, the captured image values 404 may be captured at a second location (e.g., $x_2$, $y_2$, $z_2$) in the environment. As described above, the ambiguous portions of the captured image values 404 may be calculated or determined using the model values 402.

In some examples, using techniques described previously in FIG. 3, a portion 408 of the model values 402 may be identified which overlaps or is otherwise associated with the ambiguous portions 406 of the captured image values 404. Using the portion of the model values 408 which overlaps with the ambiguous portions 406, expected values 410 may be determined for the ambiguous portions 406. For example, using the first location and second location coordinates, the portion of the model values 408 may be calibrated to determine the expected values 410 for the ambiguous portions 406 of the image. For instance, based on a change in the distance from the first location and the second location, the portion of the model values 408 may be calibrated and recalculated to determine the expected values 410. While the expected values 410 for depth and reflectivity for the ambiguous portions 406 of the image are illustrated as being different than the model values 408, in some examples, the values may be the same (e.g., depth sensing system is in a static location).

In some examples, the expected values 410 for reflectivity may differ from the model values 408 based on the difference in locations. For example, the object captured in the ambiguous portions 406 may have differing reflectivity values from different viewpoints (e.g., different orientation of a capturing device) and/or locations based on a variety of material property assumptions or on reflectance property modeling. That is, if reflectivity is known for an object in the model values 408 for a particular viewpoint and/or location in the environment, a variety of material property assumptions and/or reflectance property modeling techniques may be used to determine different expected values 410 for reflectivity for the object in the ambiguous portions 406.

Figure 5:
FIG. 5 is a graphical diagram representing measured photon counts for various depth and reflectivity values for points in space of an environment.

FIG. 5 is a graphical diagram 500 representing measured photon counts for various depth and reflectivity values for points in space of an environment. In some examples, a calibration curve 502 may be defined by the taking the lower bound of actually observed photon counts for various depth and reflectivity values, or calibrated vales 504.

In various examples, the calibrated values 504 may be determined for a particular depth sensing system which represent the photon count that can be expected for particular depth and reflectivity values. In some examples, the calibrated values may define the calibration curve 502 which has been determined using training data, or the observed photons counts and associated depth and reflectivity values. The calibration curve 502 may comprise a "cutoff" point for the number of photons needed to determine depth. Thus, points that lie below or outside the calibration curve 502 have a number of photons that is fewer than a number of photons required to determine depth. In some examples, the calibration curve 502 may define a function or representation that takes depth and/or reflectivity values as inputs and outputs an expected photon count, or outputs a result of whether the particular depth and reflectivity values can be used to determine depth. In some instances, training data may be obtained which includes images previously obtained by the particular depth sensing system, or a different depth sensing system, depth and reflectivity values 504 determined for portions of the images, and measured photon counts for the depth and reflectivity values. The training data may be used to plot the calibrated values 504 on a graphic diagram 500 which has a y-axis representing measured reflectivity values 506 and an x-axis representing the determined depth values 508. By plotting ranges of depth values along the x-axis and their associated measured reflectivity values along the y-axis, the calibration curve 502 may be determined based on the plotted calibrated values 504.

In some examples, the calibrated values 504 may be used to determine expected photon counts. For example, by comparing the expected depth and reflectivity values for ambiguous portions of an image with at least one of the calibration curve 502 or the calibrated values 504 plotted on the graphical diagram 500, an expected photon count may be determined. In this way, using the expected depth and reflectivity values for the ambiguous portions of an image, it can be determined what expected number of photons are to be expected for a particular depth sensing system, which can in turn be used to classify the ambiguous portions as either far or dark. In some examples, a noise threshold may be determined for the particular depth sensing system and used to compute uncertainty band 510. For instance, the noise threshold may comprise a minimum number of reflected photons that must be detected by the depth sensing system to allow the depth sensing system to determine that light is being reflected, rather than simply ambient light in the environment. This noise threshold may correspond to the maximum sensing range/depth of the particular sensing system as the magnitude of a light signal will degrade over distance in an environment with ambient light. In some examples, the noise threshold may be used to determine the uncertainty band 510 such that the number of photons detected within the range of the uncertainty band 510 comprise fewer photons than detectable over the noise threshold of the particular depth sensing system Thus, if an actual measured number of photons for an ambiguous portion of an image is higher than the noise threshold for the particular depth sensing system, it may be determined that an object must lie within the maximum sensing range of the particular depth sensing system. However, because the portion of the image is still ambiguous, in that the actual measured number of photons is less than a photon depth threshold number, depth for this particular ambiguous portion of the image still cannot be determined. In instances such as these, the ambiguous portion of the image which has an actual measured number of photons that is more than the noise threshold of the particular depth sensing system, but less than the photon depth threshold required to determined depth for a portion of an image, this particular ambiguous portion of the image may be classified as dark when determining depth. In other words, an object does lie within the maximum sensing range of the particular depth sensing system, but the object is dark in that its depth and reflectivity are such that the number of photons sensed by the depth sensing system cannot be used to accurately determine depth, making the object a dark object.

In some examples, the expected photon count may not need to be determined to classify the ambiguous portion of the image as dark or far. For instance, using the calibration curve 502, a function may be determined which computes the minimum reflectivity that is observable for a particular depth sensing system at an inputted expected depth. In such instances, if the function computes, for an inputted expected depth, a minimum observable reflectivity that is more than the expected reflectivity, then the ambiguous portion is classified as dark. Alternatively, if the minimum observable reflectivity for the inputted expected depth is determined to be less than the expected reflectivity, than the ambiguous portion is classified as far.

While the techniques for determining that calibrated values are described herein as using training data, other methods for determining the calibrated values may be used. For instance, using internal parameters of a particular depth sensing system, expected photon counts may be determined analytically or mathematically for various depth and reflectivity values. Further, while the techniques are described as determining expected photon count using a calibration curve, in other examples the data may be stored in a table or any other data structure configurable to store data and provide accessibility to data.

Example Processes

Figure 6:
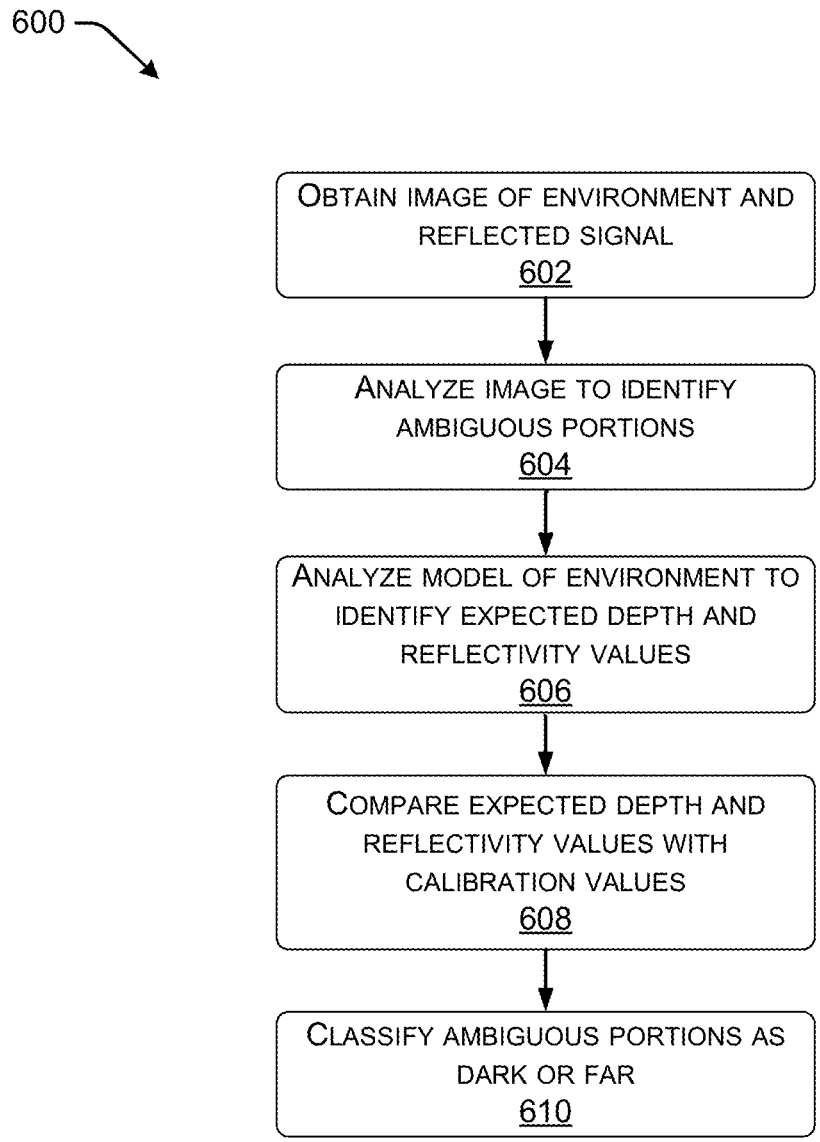
FIG. 6 is a flowchart illustrating aspects of an example process for classifying ambiguous pixels of an obtained image as far pixels or dark pixels
Figure 7:
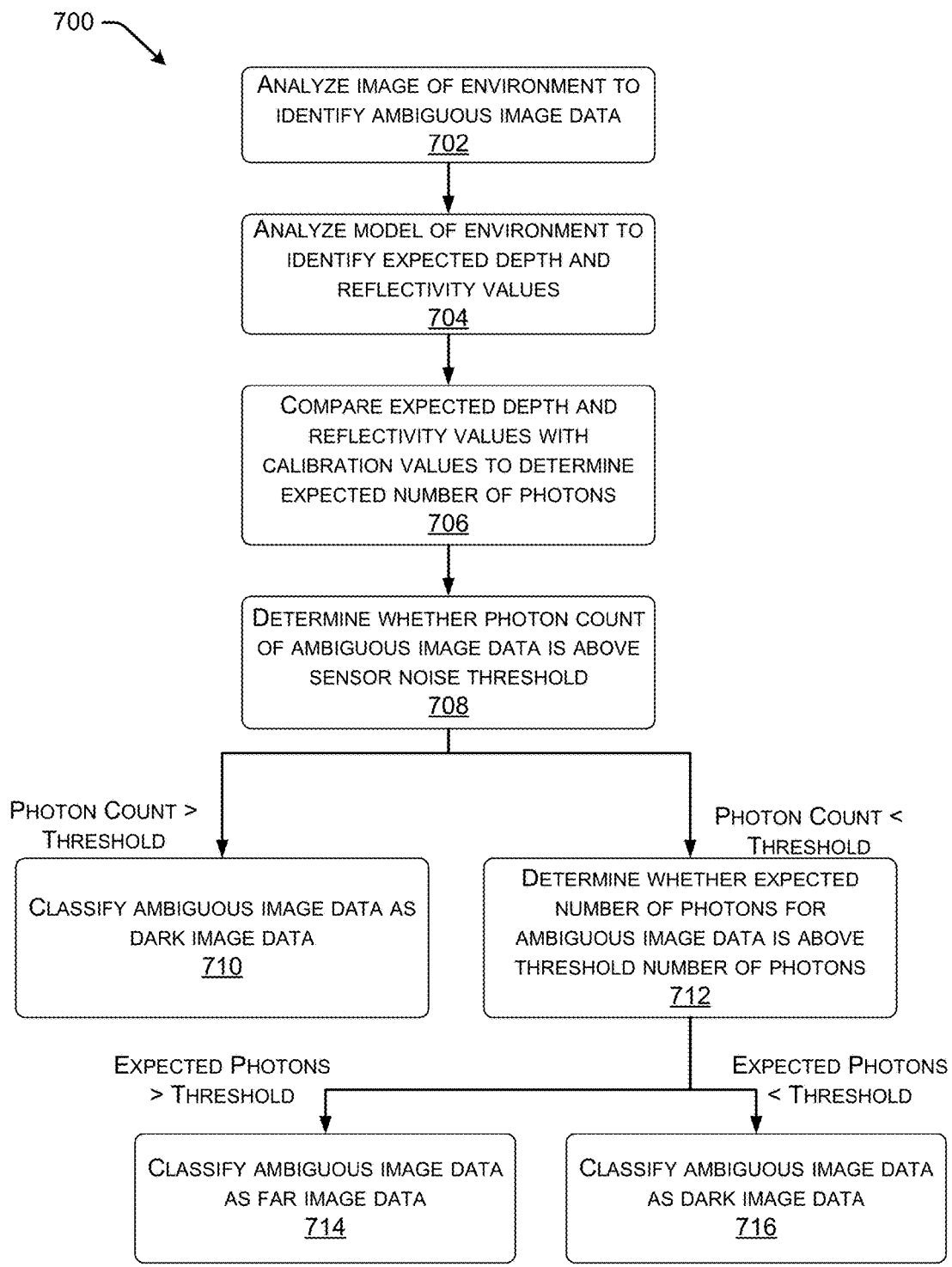
FIG. 7 is flowchart illustrating aspects of an example process for classifying ambiguous image data of an image as far image data or dark image data.

The processes described below with reference to FIG. 6 and FIG. 7 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 6 is a flowchart illustrating aspects of an example process 600 for classifying ambiguous pixels of an obtained image as far pixels or dark pixels. The example process 600 may but need not necessarily be implemented using one or more of device(s) 102 or device(s) 200. Also, the computing device(s) 102 or computing device(s) 200 may be used to implement processes other than process 600. By way of example and not limitation, the process 600 is described with reference to example computing device 200.

Block 602 illustrates a computing device (e.g., computing device 200) associated with a depth sensing system (e.g., depth sensing system 204) obtaining an image of an environment and photons of a reflected signal.

Block 604 illustrates identifying, by one or more modules (e.g., image data determination module 218), one or more ambiguous pixels of the image. In some examples, the one or more pixels may comprise pixels which have a photon count of the photons of the reflected signal that is less than a threshold number of photons.

Block 606 illustrates the one or more modules (e.g., image data determination module 218 and/or environment model updater module 220) of the computing device analyzing a model (e.g., environment model(s) 226) of the environment that represents depth and reflectivity values of pixels of previously obtained images of the environment to identify an expected depth and reflectivity values for the one or more ambiguous pixels. In some examples, analyzing the model may comprise creating a volumetric representation of the model and the image and identifying one or more pixels from the pixels of the previously stored images represented by the model that overlap with the one or more ambiguous pixels, identifying depth and reflectivity values of the one or more pixels based at least in part on the model of the environment, and computing the expected depth and reflectivity values for the one or more ambiguous pixels based at least in part on the depth and reflectivity values of the one or more pixels of the model that overlap with the one or more ambiguous pixels. In various examples, the model may comprise a table and analyzing the model may comprise looking up values in the table. In some instances, the expected depth and reflectivity values may be calibrated based on locations of where images represented in the model were taken and the location at which the image with the one or more ambiguous pixels was taken. However, the model may comprise any type of data structure for storing data.

Block 608 illustrates the one or more modules (e.g., image data determination module 218 and/or environment model updater module 220) of the computing device comparing the expected depth and reflectivity values of the one or more ambiguous pixels with calibrated values (e.g., calibrated values 228) to determine an expected number of photons for the one or more ambiguous pixels. In some examples, the calibrated values comprise a calibration curve defined by a histogram representing expected photon counts for depth and reflectivity values. In some examples, comparing the expected depth and reflectivity values with the calibrated values may comprise identifying a location on the calibration curve along an x-axis to plot the expected depth and reflectivity values and finding the corresponding y-axis value which represents the expected number of photons.

Block 610 illustrates the one or more modules (e.g., image data determination module 218 and/or environment model updater module 220) of the computing device classifying the one or more ambiguous pixels as either dark pixels or far pixels based at least in part on the pixels having the photon count that is less than the threshold number of photons and on the expected number of photons. In various examples, the classifying the one or more ambiguous pixels comprises determining that the expected number of photons for the one or more ambiguous pixels is higher than the threshold number of photons, and based at least in part on the determining, classifying the one or more ambiguous pixels as far pixels. In some examples, classifying the one or more ambiguous pixels as either dark pixels or far pixels comprises determining that the expected depth of the one or more ambiguous photons is further than a maximum depth associated with the threshold number of photons, wherein the maximum depth comprises a distance from the depth camera system at which photons are no longer detectable over a noise threshold associated with the depth camera system, and based at least in part on the determining, classifying the one or more ambiguous pixels as dark pixels.

FIG. 7 is flowchart illustrating aspects of an example process 700 for classifying ambiguous image data of an image as far image data or dark image data. The example process 700 may but need not necessarily be implemented using one or more of device(s) 102 or device(s) 200. Also, the computing device(s) 102 or computing device(s) 200 may be used to implement processes other than process 700. By way of example and not limitation, the process 700 is described with reference to example computing device 200.

Block 702 illustrates analyzing, by one or more modules (e.g., image data determination module 218), an image of an environment to identify ambiguous image data in the image, the ambiguous image data having a photon count of a reflected signal detected by a depth camera that is less than a threshold number of photons required to determine depth the ambiguous image data.

Block 704 illustrates analyzing, by the one or more modules (e.g., image data determination module 218), a model of the environment (e.g., environment model(s) 226) that represents depth and reflectivity values of image data of previously obtained images of the environment to identify expected depth and reflectivity values for the ambiguous image data. In some examples, the model of the environment (e.g., environment model(s) 226) may comprise a volumetric representation of the environment that is created using previously obtained images and depth and reflectivity values for those images. In various examples, the model of the environment may comprise any type of data structure, such as a table populated with locations and associated depth and reflectivity values.

Block 706 illustrates comparing, by the one or more modules (e.g., image data determination module 218), the expected depth and reflectivity values for the ambiguous image data with calibrated values (e.g., calibrated values 228) to determine an expected number of photons for the ambiguous image data. In some examples, the calibrated values comprise a calibration curve defined by a histogram representing expected photon counts for depth and reflectivity values. In some examples, comparing the expected depth and reflectivity values with the calibrated values may comprise identifying a location on the calibration curve along an x-axis to plot the expected depth and reflectivity values and finding the corresponding y-axis value which represents the expected number of photons. In other examples, the calibrated values may comprise a table storing photon numbers that are expected for various depth and reflectivity values for a particular depth sensing system.

Block 708 illustrates determining, by the one or more modules, whether the photon count of the ambiguous image data is above a sensor noise threshold associated with the depth camera. In some examples, the sensor noise threshold comprises a number of photons that is required to be detected by a particular depth sensing system.

Block 710 illustrates, classifying, by the one or more modules, the ambiguous image data as dark image data in response to determining that the photon count of the ambiguous image data is above the sensor noise threshold and below the threshold number of photons required to determine depth. For instance, if the modules determine that the photon count is above the sensor noise threshold, the depth sensing system may be detecting an object. However, because the photon count is below the threshold number of photons required to determine depth, the object may be dark as it does not reflect photons effectively relative to other objects.

Block 712 illustrates determining, by the one or more modules (e.g., image data determination module 218), whether the expected number of photons for the ambiguous image data is above the threshold number of photons required to determine depth in response to determining that the photon count of the ambiguous image data is below the sensor noise threshold associated with the depth camera.

Block 714 illustrates classifying, by the one or more modules (e.g., image data determination module 218), the ambiguous image data as far image data in response to determining that the expected number of photons is above the threshold number of photons required to determine depth. For instance, if the expected number of photons is above the threshold number of photons required to determine depth, but the actual measured amount is below the sensor noise threshold for the particular depth sensing system, then the ambiguous image data may be far (outside the range at which the sensor can detect).

Block 716 illustrates classifying the ambiguous image data as dark image data in response to determining that the expected number of photons is below the threshold number of photons required to determine depth. For example, if the expected number of photons is below the threshold number of photons, then an object in the image data may not reflect very much light relative to other objects, making the image data dark.

Example Clauses

The disclosure presented herein can be considered in view of the following clauses.

A. In some examples, a system comprises: a depth camera system to project a signal onto an environment and capture an image of the environment and a reflected signal; one or more processors communicatively coupled to the depth camera system; and memory having computer-executable instructions stored thereupon which, when executed by the one or more processors, cause the one or more processors to perform operations comprising: obtaining, from the depth camera system, an image of the environment and photons of the reflected signal; identifying one or more ambiguous pixels of the image, the one or more ambiguous pixels comprising pixels having a photon count of the photons of the reflected signal that is less than a threshold number of photons required to determine depth; analyzing a model of the environment that represents depth and reflectivity values of pixels of previously obtained images of the environment to identify an expected depth and reflectivity values for the one or more ambiguous pixels; comparing the expected depth and reflectivity values of the one or more ambiguous pixels with calibrated values; and based at least in part on the comparing the expected depth and reflectivity values of the one or more ambiguous pixels with the calibrated values, classifying the one or more ambiguous pixels as either dark pixels or far pixels.

B. The system of paragraph A, wherein: comparing the expected depth and reflectivity values includes determining an expected number of photons for the one or more ambiguous pixels; and the classifying the one or more ambiguous pixels as either dark pixels or far pixels comprises: determining that the expected number of photons for the one or more ambiguous pixels is higher than the threshold number of photons; and based at least in part on the determining, classifying the one or more ambiguous pixels as far pixels.

C. The system of paragraph A or B, wherein the classifying the one or more ambiguous pixels as either dark pixels or far pixels comprises: determining that the expected depth of the one or more ambiguous photons is further than a maximum depth associated with the threshold number of photons, wherein the maximum depth comprises a distance from the depth camera system at which photons are no longer detectable over a noise threshold associated with the depth camera system; and based at least in part on the determining, classifying the one or more ambiguous pixels as dark pixels.

D. The system of any of paragraphs A-C, wherein the threshold number of photons comprises at least one of: a number of photons required to determine depth for a pixel; or a number of photons that are detectable over a noise threshold associated with the depth camera system.

E. The system of any of paragraphs A-D, the operations further comprising: analyzing previously taken images of the environment to compute depth and reflectivity values for a particular pixel of the previously taken images; and computing the model based at least in part on the depth and reflectivity values for the particular pixel.

F. The system of any of paragraphs A-E, wherein analyzing the model of the environment to identify the expected depth and reflectivity for the one or more ambiguous pixels comprises: identifying one or more pixels from the pixels of the previously stored images represented by the model that overlap with the one or more ambiguous pixels; identifying depth and reflectivity values of the one or more pixels based at least in part on the model of the environment; and computing the expected depth and reflectivity values for the one or more ambiguous pixels based at least in part on the depth and reflectivity values of the one or more pixels of the model that overlap with the one or more ambiguous pixels.

G. The system of any of paragraphs A-F, wherein the model of the environment comprises at least one of: a three-dimensional representation of the environment comprising points representing the environment in three-dimensional space that are associated with depth and reflectivity values; or a polygonised mesh textured with reflectivity values.

H. The system of any of paragraphs A-G, wherein the calibrated values comprise data derived from a histogram representing expected photon counts for depth and reflectivity values.

I. The system of any of paragraphs A-H, the operations further comprising: analyzing the image of the environment to determine depth and reflectivity values for a plurality of pixels in the image; and updating the model of the environment by combining the depth and reflectivity values for the plurality of pixels and the classification of the one or more ambiguous pixels with the model of the environment that represents the depth and reflectivity values of the pixels of the previously obtained images.

J. In some examples, one or more computer storage media store computer-readable instructions that, when executed by one or more processors, configure the one or more processors to perform operations comprising: analyzing an image of an environment to identify ambiguous image data in the image, the ambiguous image data having a photon count of a reflected signal detected by a depth camera that is less than a threshold number of photons required to determine depth the ambiguous image data; analyzing a model of the environment that represents depth and reflectivity values of image data of previously obtained images of the environment to identify expected depth and reflectivity values for the ambiguous image data; comparing the expected depth and reflectivity values for the ambiguous image data with calibrated values; and based at least in part on the comparing the expected depth and reflectivity values for the ambiguous image data with the calibrated values, classifying the ambiguous image data as either dark image data or as far image data.

K. The one or more computer storage media of paragraph J, the operations further comprising: analyzing the image data of the previously obtained images of the environment to compute the depth and reflectivity values for a portion of the previously taken images; and calculating the model of the environment based at least in part on the depth and reflectivity values for the portion of the previously taken images.

L. The one or more computer storage media of paragraph J or K, the operations further comprising: determining whether the photon count of the ambiguous image data is above a sensor noise threshold associated with the depth camera; and wherein the classifying the ambiguous image data as either dark image data or as far image data comprises, in response to determining that the photon count of the ambiguous image data is above the sensor noise threshold and below the threshold number of photons required to determine depth, classifying the ambiguous image data as dark image data.

M. The one or more computer storage media of paragraph J or K, the operations further comprising: determining whether the photon count of the ambiguous image data is above a sensor noise threshold associated with the depth camera; determining an expected number of photons for the ambiguous image data based at least in part on the calibrated values; in response to determining that the photon count of the ambiguous image data is below the sensor noise threshold associated with the depth camera, determining whether the expected number of photons for the ambiguous image data is above the threshold number of photons required to determine depth; and wherein the classifying the ambiguous image data as either dark image data or as far image data comprises: in response to determining that the expected number of photons is above the threshold number of photons required to determine depth, classifying the ambiguous image data as far image data; or in response to determining that the expected number of photons is below the threshold number of photons required to determine depth, classifying the ambiguous image data as dark image data.

N. The one or more computer storage media of paragraph J or K, the operations further comprising: determining, based at least in part on the calibrated values, a function to calculate minimum reflectivity values that are observable by the depth camera for inputted depth values; inputting the expected depth values into the function to determine minimum reflectivity values observable by the depth camera for the expected depth values; determining whether the expected reflectivity values are higher than the minimum reflectivity values observable by the depth camera for the expected depth values; and wherein the classifying the ambiguous image data as either dark image data or as far image data comprises: in response to determining that the expected reflectivity values are lower than the minimum reflectivity values observable by the depth camera for the expected depth values, classifying the ambiguous image data as dark image data; or in response to determining that the expected reflectivity values are higher than the minimum reflectivity values observable by the depth camera for the expected depth values, classifying the ambiguous image data as far image data.

O. The one or more computer storage media of any of paragraphs J-N, the operations further comprising: analyzing the image data of the previously obtained images of the environment to compute the depth and reflectivity values for a plurality of portions of the previously taken images; and calculating the model of the environment based at least in part on the depth and reflectivity values for the plurality of portions of the previously taken images.

P. The one or more computer storage media of any of paragraphs J-O, wherein analyzing the model of the environment to identify the expected depth and reflectivity values for the ambiguous image data comprises: identifying particular depth and reflectivity values for points in space of the environment represented in the model that correspond to locations captured in the image of the environment associated with the ambiguous image data; and determining the expected depth and reflectivity values for the ambiguous image data based at least in part on the particular depth and reflectivity values.

Q. The one or more computer storage media of any of claims J-P, wherein the model of the environment comprises a volumetric representation of the environment comprising points representing the environment in three-dimensional space that are associated with the depth and reflectivity values.

R. The one or more computer storage media of any of claims J-Q, the operations further comprising: analyzing the image of the environment to determine depth and reflectivity values for one or more portions of the image; and updating the model of the environment by combining the depth and reflectivity values for the one or more portions of the image with the depth and reflectivity values of the image data of the previously obtained images.

S. In some examples, a method comprises: analyzing, by one or more processors of a computing device, an image of an environment to identify ambiguous image data in the image, the ambiguous image data comprising at least a portion of the image that has a photon count of a reflected signal detected by a depth camera that is less than a threshold number of photons; analyzing, by the one or more processors, a representation of the environment to identify expected depth and reflectivity values for the ambiguous image data, the representation of the environment comprising depth and reflectivity values of image data of previously obtained images of the environment; comparing, by the one or more processors, the expected depth and reflectivity values for the ambiguous image data with calibrated values; based at least in part on the comparing the expected depth and reflectivity values with the calibrated values, classifying the ambiguous image data as either dark image data or far image data.

T. The method of paragraph S, wherein the representation of the environment comprises a three-dimensional representation of the environment comprising points in three-dimensional space that are associated with depth and reflectivity values for objects in the environment with which they are associated; the method further comprising: creating a three-dimensional representation of the image; projecting the three-dimensional representation of the environment onto the three-dimensional representation of the image; and identifying a portion of the three-dimensional representation of the environment that overlaps with portion of the image associated with the ambiguous image data.

U. The method of paragraph S or T, wherein analyzing the representation of the environment to identify the expected depth and reflectivity values for the ambiguous image data comprises: identifying a first location of the computing device in the environment at which a portion of the image data of the previously obtained images of the representation was obtained, the portion of the image data of the previously obtained images of the presentation being associated with depth and reflectivity values, the portion of the image data of the previously obtained images corresponding to the portion of the image associated with the ambiguous image data; identifying a second location of the computing device in the environment at which the image of the environment was taken; calculating at least one of a location difference or an orientation difference between the first location of the computing device in the environment and the second location of the computing device in the environment; and determining, based at least in part on the at least one of the location difference or the orientation difference, the expected depth and reflectivity values for the ambiguous image data.

V. The method of any of paragraphs S-U, wherein the calibrated values comprises a curve defined by a histogram representing expected photon counts for depth and reflectivity values.

W. The method of paragraph V, further comprising determining the curve, the determining comprising at least one of: constructing the histogram in real-time as depth and reflectivity values are determined by a depth sensing camera associated with the computing device for an environment. analyzing a plurality of training images including image data associated with ground truth depth and reflectivity values to construct the histogram; or deriving the curve analytically based at least in part on intrinsic parameters of the depth sensing camera associated with the computing device.

X. The method of any of paragraphs S-W, wherein the threshold number of photons comprises at least one of: a number of photons required to determine depth for a pixel; or a number of photons that are detectable over a noise threshold associated with the depth camera.

Y. One or more computer-readable media encoded with instructions that, when executed by one or more processors, configure a computing to perform a method as any of paragraphs S-W recite.

Z. A device comprising one or more processors, one or more sensors, and one or more computer-readable media encoded with instructions that, when executed by the one or more processors, configure a computer to perform a method as any of paragraphs S-W recite.

AA. A computer-implemented method comprising: means for analyzing an image of an environment to identify ambiguous image data in the image, the ambiguous image data comprising at least a portion of the image that has a photon count of a reflected signal detected by a depth camera that is less than a threshold number of photons; means for analyzing a representation of the environment to identify expected depth and reflectivity values for the ambiguous image data, the representation of the environment comprising depth and reflectivity values of image data of previously obtained images of the environment; means for comparing the expected depth and reflectivity values for the ambiguous image data with calibrated values; based at least in part on the comparing the expected depth and reflectivity values with the calibrated values, means for classifying the ambiguous image data as either dark image data or far image data.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

For example, various computer architectures may be used to implement the techniques described herein. In some examples, the computer architectures may be a server computer, mobile phone, a PDA, a smart phone, a desktop computer, a netbook computer, a tablet computer, a laptop computer, and/or a wearable computer. The various computer architectures may include a central processing unit ("CPU"), a system memory, including a random access memory ("RAM") and a read-only memory ("ROM"), and a system bus that coupled the memory to the CPU. A basic input/output ("BIOS") containing the basic routines that help to transfer information between elements within the computer architecture, such as during startup, is stored in the ROM. In some examples, the computer architectures may include sensor components, such as a magnetometer, ambient light sensor, proximity sensor, accelerometer, gyroscope, and/or a GPS sensor. The computer architectures may further include input/output components, such as a display, touchscreen, audio input/output, video input/output, or other data input/output. Various power components may also be included in the computer architectures, such as a battery and/or a battery gauge.

The computer architecture may further include a mass storage device for storing an operating system (e.g., operating system 216), application(s) (e.g., application(s) 222) programs, module(s) (e.g., image data determination module 218, environment model updater module 220, etc.), and the like, as described above with reference to FIG. 2. Additionally, and/or alternatively, the mass storage device can store sensor data (e.g., from sensors 112 and 212), image data 224 (e.g., photographs, computer generated images, object information about real and/or virtual objects in a scene, metadata about any of the foregoing, etc.), environment model(s) 226, calibrated values 228, and the like, as described herein.

The mass storage device and its associated computer-readable media provide non-volatile storage for the computer architecture. Mass storage device, computer-readable media 110 and computer-readable media 214 are examples of computer-readable media according to this disclosure. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium," and variations thereof, does not include communication media.

In some examples, a distributed computing environment may execute the software components described herein for implementing classification of ambiguous depth data. According to various implementations, the distributed computing environment includes a computing environment operating on, in communication with, or as part of a network (e.g., Wide Area Network ("WAN"), Local Area Network ("LAN"), Metropolitan Area Network ("MAN"), etc.). In at least one example, at least some of computing environment can correspond to the one or more of the computing devices 102 and/or the computing device 200. The network can include various access networks. One or more client devices (hereinafter referred to collectively and/or generically as "clients") can communicate with the computing environment via the network and/or other connections. By way of example, computing device 102 in FIG. 1, computing device and device 200 in FIG. 2 can correspond to one or more client devices. In one illustrated configuration, the clients include a computing device such as a laptop computer, a desktop computer, or other computing device, a slate or tablet computing device ("tablet computing device"), a mobile computing device such as a mobile telephone, a smart phone, or other mobile computing device, a server computer, a wearable computer, and/or other devices. It should be understood that any number of clients can communicate with the computing environment.

In some configurations, the distributed computing environment includes application servers, data storage, and one or more network interfaces. According to various implementations, the functionality of the application servers can be provided by one or more server computers that are executing as part of, or in communication with, the network. In some examples, the computing environment can correspond to or be representative of one or more servers, which are in communication with and accessible by the clients. In that case, the applications servers are examples of servers included in distributed computing environment. For example, the computing environment can correspond to devices in the distributed computing environment which provide additional services and/or functionality for the device 102 and/or 200. It should be understood that this example is illustrative, and should not be construed as being limited in any way.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language, such as the phrases "and/or" and "at least one of X, Y or Z," unless specifically stated otherwise, are to be understood to indicate that an item, term, etc. can be X, Y, or Z, or a combination thereof.

What is claimed is:

1. A system comprising:
a depth camera system to project a signal onto an environment and capture an image of the environment and a reflected signal;
one or more processors communicatively coupled to the depth camera system; and
memory having computer-executable instructions stored thereupon which, when executed by the one or more processors, cause the one or more processors to perform operations comprising:
obtaining, from the depth camera system, an image of the environment and photons of the reflected signal;
identifying one or more ambiguous pixels of the image, the one or more ambiguous pixels comprising pixels having a photon count of the photons of the reflected signal that is less than a threshold number of photons required to determine depth;
analyzing a model of the environment that represents depth and reflectivity values of pixels of previously obtained images of the environment to identify an expected depth and reflectivity values for the one or more ambiguous pixels;
comparing the expected depth and reflectivity values of the one or more ambiguous pixels with calibrated values, wherein the calibrated values comprise data derived from expected photon counts for depth and reflectivity values;
based at least in part on the comparing the expected depth and reflectivity values of the one or more ambiguous pixels with the calibrated values, classifying the one or more ambiguous pixels as either dark pixels or far pixels; and
displaying a scene based on the classifying the one or more ambiguous pixels as either dark pixels or far pixels.

2. The system of claim 1, wherein:
comparing the expected depth and reflectivity values includes determining an expected number of photons for the one or more ambiguous pixels; and
the classifying the one or more ambiguous pixels as either dark pixels or far pixels comprises:
determining that the expected number of photons for the one or more ambiguous pixels is higher than the threshold number of photons; and
based at least in part on the determining, classifying the one or more ambiguous pixels as far pixels.

3. The system of claim 1, wherein the classifying the one or more ambiguous pixels as either dark pixels or far pixels comprises:
determining that the expected depth of the one or more ambiguous pixels is further than a maximum depth associated with the threshold number of photons, wherein the maximum depth comprises a distance from the depth camera system at which photons are no longer detectable over a noise threshold associated with the depth camera system; and
based at least in part on the determining, classifying the one or more ambiguous pixels as dark pixels.

4. The system of claim 1, wherein the threshold number of photons comprises at least one of:
a number of photons required to determine depth for a pixel; or
a number of photons that are detectable over a noise threshold associated with the depth camera system.

5. The system of claim 1, the operations further comprising:
analyzing previously taken images of the environment to compute depth and reflectivity values for a particular pixel of the previously taken images; and
computing the model based at least in part on the depth and reflectivity values for the particular pixel.

6. The system of claim 1, wherein analyzing the model of the environment to identify the expected depth and reflectivity values for the one or more ambiguous pixels comprises:
identifying one or more pixels from the pixels of the previously obtained images represented by the model that overlap with the one or more ambiguous pixels;
identifying depth and reflectivity values of the one or more pixels based at least in part on the model of the environment; and
computing the expected depth and reflectivity values for the one or more ambiguous pixels based at least in part on the depth and reflectivity values of the one or more pixels of the model that overlap with the one or more ambiguous pixels.

7. The system of claim 1, wherein the model of the environment comprises at least one of:
a three-dimensional representation of the environment comprising points representing the environment in three-dimensional space that are associated with depth and reflectivity values; or
a polygonised mesh textured with reflectivity values.

8. The system of claim 1, wherein the expected photon counts for the depth and reflectivity values are represented in a histogram.

9. The system of claim 1, the operations further comprising:
analyzing the image of the environment to determine depth and reflectivity values for a plurality of pixels in the image; and updating the model of the environment by combining the depth and reflectivity values for the plurality of pixels and the classification of the one or more ambiguous pixels with the model of the environment that represents the depth and reflectivity values of the pixels of the previously obtained images.

10. A system comprising:

one or more processors; and computer storage media storing computer-readable instructions that, when executed by the one or more processors, configure the one or more processors to perform operations comprising:

analyzing an image of an environment to identify ambiguous image data in in the image, the ambiguous image data having a photon count of a reflected signal detected by a depth camera that is less than a threshold number of photons required to determine depth for the ambiguous image data;

analyzing a model of the environment that represents depth and reflectivity values of image data of previously obtained images of the environment to identify expected depth and reflectivity values for the ambiguous image data;

comparing the expected depth and reflectivity values for the ambiguous image data with calibrated values, wherein the calibrated values comprise data derived from expected photon counts for depth and reflectivity values;

based at least in part on the comparing the expected depth and reflectivity values for the ambiguous image data with the calibrated values, classifying the ambiguous image data as either dark image data or as far image data; and displaying a scene based on the classifying the ambiguous image data as either dark image data or far image data.

11. The system of claim 10, the operations further comprising:

analyzing the image data of the previously obtained images of the environment to compute the depth and reflectivity values for a portion of the previously obtained images; and calculating the model of the environment based at least in part on the depth and reflectivity values for the portion of the previously obtained images.

12. The system of claim 10, the operations further comprising:

determining whether the photon count of the ambiguous image data is above a sensor noise threshold associated with the depth camera; and wherein the classifying the ambiguous image data as either dark image data or as far image data comprises, in response to determining that the photon count of the ambiguous image data is above the sensor noise threshold and below the threshold number of photons required to determine depth for the pixel, classifying the ambiguous image data as dark image data.

13. The system of claim 10, the operations further comprising:

determining whether the photon count of the ambiguous image data is above a sensor noise threshold associated with the depth camera;

determining an expected number of photons for the ambiguous image data based at least in part on the calibrated values;

in response to determining that the photon count of the ambiguous image data is below the sensor noise threshold associated with the depth camera, determining whether the expected number of photons for the ambiguous image data is above the threshold number of photons required to determine depth for the pixel; and wherein the classifying the ambiguous image data as either dark image data or as far image data comprises:

in response to determining that the expected number of photons is above the threshold number of photons required to determine depth for the pixel, classifying the ambiguous image data as far image data; or in response to determining that the expected number of photons is below the threshold number of photons required to determine depth for the pixel, classifying the ambiguous image data as dark image data.

14. The system claim 10, the operations further comprising:

determining, based at least in part on the calibrated values, a function to calculate minimum reflectivity values that are observable by the depth camera for inputted depth values;

inputting the expected depth values into the function to determine minimum reflectivity values observable by the depth camera for the expected depth values;

determining whether the expected reflectivity values are higher than the minimum reflectivity values observable by the depth camera for the expected depth values; and wherein the classifying the ambiguous image data as either dark image data or as far image data comprises:

in response to determining that the expected reflectivity values are lower than the minimum reflectivity values observable by the depth camera for the expected depth values, classifying the ambiguous image data as dark image data; or in response to determining that the expected reflectivity values are higher than the minimum reflectivity values observable by the depth camera for the expected depth values, classifying the ambiguous image data as far image data.

15. A method comprising:

analyzing, by one or more processors of a computing device, an image of an environment to identify ambiguous image data in the image, the ambiguous image data comprising at least a portion of the image that has a photon count of a reflected signal detected by a depth camera that is less than a threshold number of photons, wherein the threshold number of photons comprises at least one of a number of photons required to determine depth for a pixel or a number of photons that are detectable over a noise threshold associated with the depth camera;

analyzing, by the one or more processors, a representation of the environment to identify expected depth and reflectivity values for the ambiguous image data, the representation of the environment comprising depth and reflectivity values of image data of previously obtained images of the environment;

comparing, by the one or more processors, the expected depth and reflectivity values for the ambiguous image data with calibrated values, wherein the calibrated values comprise data derived from expected photon counts for depth and reflectivity values;

based at least in part on the comparing the expected depth and reflectivity values with the calibrated values, classifying the ambiguous image data as either dark image data or far image data; and displaying a scene based on the classifying the ambiguous image data as either dark image data or far image data.

16. The method of claim 15, wherein the representation of the environment comprises a three-dimensional representation of the environment comprising points in three-dimensional space that are associated with depth and reflectivity values for objects in the environment with which they are associated;

the method further comprising:
creating a three-dimensional representation of the image;
projecting the three-dimensional representation of the environment onto the three-dimensional representation of the image; and
identifying a portion of the three-dimensional representation of the environment that overlaps with the portion of the image associated with the ambiguous image data.

17. The method of claim 15, wherein analyzing the representation of the environment to identify the expected depth and reflectivity values for the ambiguous image data comprises:
identifying a first location of the computing device in the environment at which a portion of the image data of the previously obtained images of the representation was obtained, the portion of the image data of the previously obtained images being associated with depth and reflectivity values, the portion of the image data of the previously obtained images corresponding to the portion of the image associated with the ambiguous image data;
identifying a second location of the computing device in the environment at which the image of the environment was taken;
calculating at least one of a location difference or an orientation difference between the first location of the computing device in the environment and the second location of the computing device in the environment; and
determining, based at least in part on the at least one of the location difference or the orientation difference, the expected depth and reflectivity values for the ambiguous image data.

18. The method of claim 15, wherein the expected photon counts for depth and reflectivity values are represented in a curve defined by a histogram.

19. The method of claim 18, further comprising determining the curve, the determining comprising at least one of:
constructing the histogram in real-time as depth and reflectivity values are determined by a depth sensing camera associated with the computing device for an environment;
analyzing a plurality of training images including image data associated with ground truth depth and reflectivity values to construct the histogram; or
deriving the curve analytically based at least in part on intrinsic parameters of the depth sensing camera associated with the computing device.

* * * * *